United States Patent
Chui et al.

Patent Number: 6,041,143
Date of Patent: Mar. 21, 2000

[54] MULTIRESOLUTION COMPRESSED IMAGE MANAGEMENT SYSTEM AND METHOD

[75] Inventors: Charles K. Chui, Menlo Park; Lefan Zhang, Sunnyvale, both of Calif.

[73] Assignee: Teralogic Incorporated, Mountain View, Calif.

[21] Appl. No.: 09/060,398

[22] Filed: Apr. 14, 1998

[51] Int. Cl.[7] ...................................................... G06K 9/36
[52] U.S. Cl. .............................................................. 382/232
[58] Field of Search ..................................... 382/232, 236, 382/239, 240, 242, 243, 246, 248

[56] References Cited

U.S. PATENT DOCUMENTS

| 5,748,789 | 5/1998 | Lee et al. | 382/239 |
| 5,778,098 | 7/1998 | Lee et al. | 382/236 |
| 5,867,602 | 2/1999 | Zandi et al. | 382/240 |
| 5,881,176 | 3/1999 | Keith et al. | 382/244 |

*Primary Examiner*—Jose L. Couso
*Attorney, Agent, or Firm*—Pennie & Edmonds LLP

[57] ABSTRACT

In a multiresolution image processing system images are stored in files that contain thumbnail data as well as a full image data structure. The image data is preferably wavelet or wavelet-like transform coefficients, generated by applying a wavelet or wavelet-like transform to an image multiple times. Data representing mid-level resolution images are generated on the fly by extracting from the full image data structure only the data needed for the user or application selected resolution level. If the user has selected a subset of the image for viewing at a higher resolution level, a corresponding mid-level resolution image is constructed by extracting from the full image data structure the data needed for the user specified image portion at the user or application selected resolution level. The full image data structure is preferably encoded and stored in a manner allowing the image data for mid-level resolution images to be efficiently extracted without having to compute or recompute any image coefficients. By storing only thumbnail data and the full image data in an image file, and producing image data structures for other resolution levels on the fly, the storage requirements for image files are reduced. Since the image data structures for other resolution levels can be generated with minimal computational resources in a small fraction of a second, in most implementations the user will not be adversely affected by the non-inclusion of the other resolution levels in the image file.

22 Claims, 8 Drawing Sheets

Multiresultion Image Data Structure
90

MULTIRESOLUTION COMPRESSED IMAGE MANAGEMENT SYSTEM AND METHOD

The present invention relates generally to image storage and compression systems, and particularly to an image management system in which digitally encoded images can be viewed at a number of resolutions, printed, cropped, and otherwise manipulated.

BACKGROUND OF THE INVENTION

Referring to FIG. 1, "FlashPix" is a data storage format for digitally encoded images in which the image is stored at a number of resolution levels. If FIG. 1 the images stored at the different resolution levels are represented by planes intersecting a pyramid at different levels.

The image is stored at a number of resolution levels 1 to N, typically with each resolution level differing from its neighbors by a resolution factor of four. In other words, if the highest resolution representation (at resolution level 1) of the image contains X amount of information, the second resolution level representation contains X/4 amount of information, the third resolution level representation contains X/16 amount of information, and so on. The number of resolution levels stored in a FlashPix image file will depend on the size of the highest resolution representation of the image and the minimum acceptable resolution for the thumbnail image at the lowest resolution level. For instance, if the full or highest resolution image is a high definition picture having about 4 million pixels (e.g., a 2048×2048 pixel image), the FlashPix file might contain five resolution level representations of the image in addition to the highest resolution image, including 1024×1024, 512×512, 256×256, 128×128, and 32×32 representations of the image. For ease of discussion, each resolution level representation of the image will be called "an image". The total size of the FlashPix file (i.e., the amount of memory storage required to store the file or data structure) for an image is typically about $1\frac{1}{3}$ times the size required to store the highest resolution representation of the image. By computing and storing the image at multiple resolutions, the time required to transition from one image resolution to another is reduced. Also, the amount of computational resources required to zoom in on a portion of an image is reduced. This is a classic tradeoff between speed and memory resource utilization.

In the prior art implementations of FlashPix files, the image has been encoded in JPEG format, which uses DCT (discrete cosine transform) to transform each 8×8 block of image pixels into an 8×8 array of coefficients that are then quantized and Huffman run length encoded.

It is a goal of the present invention to provide an image storage format and method that provides the same advantages as the FlashPix file format, but which stores image data more efficiently and which allows intermediate resolution images to be generated very efficiently on the fly, instead of having to pre-compute and store them in a file.

Another object of the present invention is to expand the FlashPix file format definition to include images compressed using wavelet or wavelet-like data transforms.

SUMMARY OF THE INVENTION

In summary, the present invention is a multiresolution image processing system. Images are initially stored in files that contain thumbnail data, as well as a full image data structure. The image data is preferably wavelet or wavelet-like transform coefficients, generated by applying a wavelet or wavelet-like transform to an image multiple times and then quantizing the resulting values. The resulting wavelet transform coefficients are encoded using a sparse data encoding technique that highly compresses the amount of memory required to store the wavelet transform coefficients.

Data representing mid-level resolution images are generated on the fly by extracting from the full image data structure only the data needed for the user or application selected resolution level. If the user has selected a subset of the image for viewing at a higher resolution level, a corresponding mid-level resolution image is constructed by extracting from the full image data structure the data needed for the user specified image portion at the user or application selected resolution level.

The full image data structure is preferably encoded and stored in a manner allowing the image data for mid-level resolution images to be efficiently extracted without having to compute or recompute any image coefficients. Extraction of the data for a mid-resolution level image may, in some cases, require that data at some array boundaries be decoded and then re-encoded (i.e., decompressed and recompressed) to allow unneeded data to be eliminated. By storing only thumbnail data and the full image data in an image file, and producing image data structures for other resolution levels on the fly, the storage requirements for image files are reduced. Further, since the image data structures for other resolution levels can be generated with minimal computational resources in a small fraction of a second, in most implementations the user will not be adversely affected by the non-inclusion of the other resolution levels in the image file.

Thumbnail images, mid-level resolution images and high resolution images produced by decoding and rendering the image data from the corresponding data structures can be used for many purposes, including displaying on a variety of display devices, printing. The image data, or the encoded image data for a user selected resolution level can also be transmitted over communication networks to remotely located devices.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
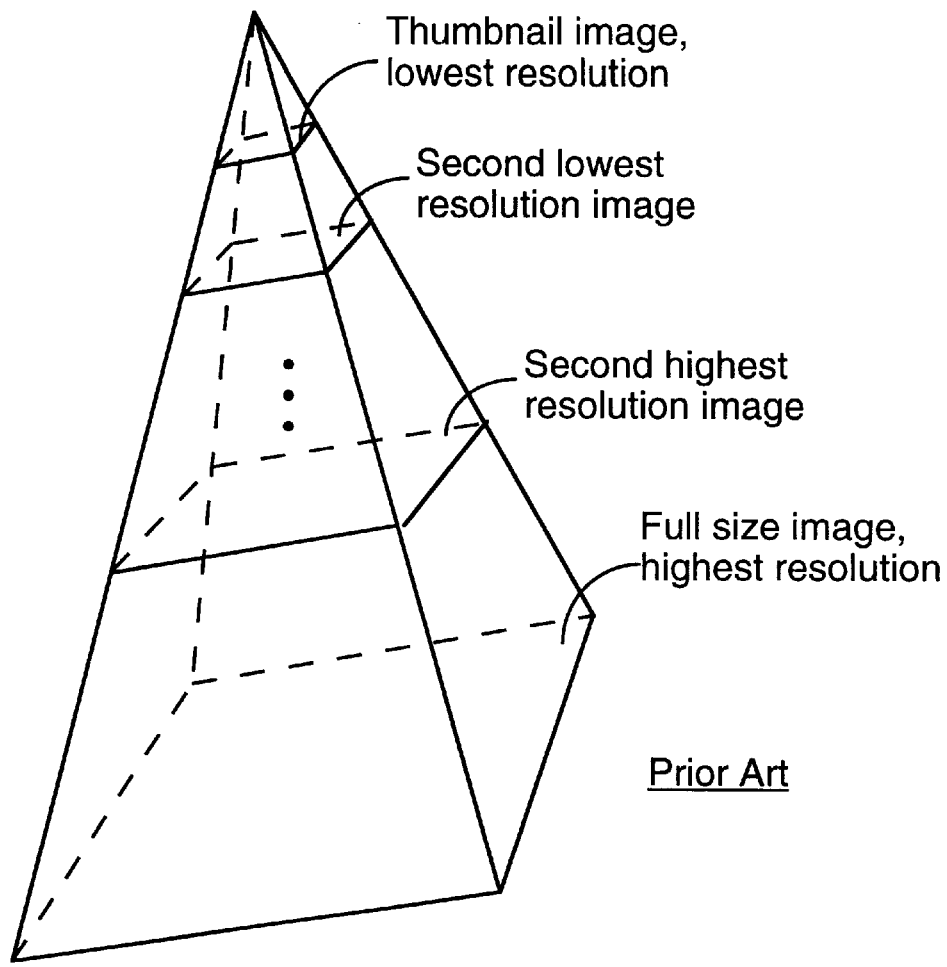
FIG. 1 is a conceptual representation of a multiresolution image file, showing the multiple resolutions at which an image has been stored.
Figure 2:
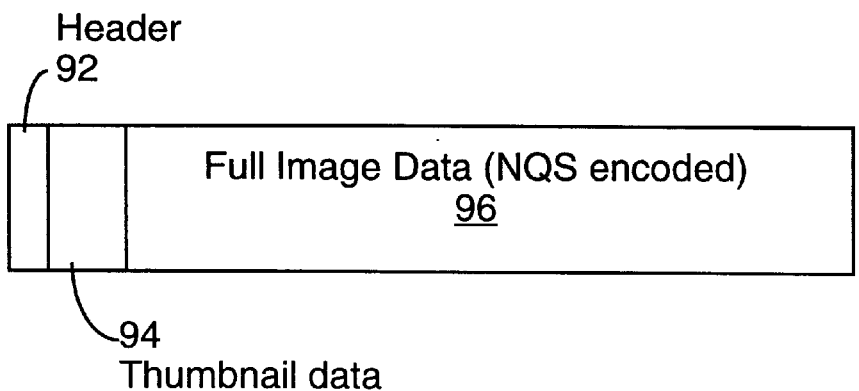
FIG. 2 depicts a multiresolution image file format used in a preferred embodiment.

Referring to FIG. 2, in a preferred embodiment of the present invention an image is stored in a multiresolution image data structure 90 that includes a header 92, thumbnail data 94 representing a thumbnail (low resolution) version of the image, and full image data 96 representing a highest resolution version of the image. The thumbnail data and full image data will be described in more detail below, after a brief discussion of the computer environment in which the invention operates and the wavelet or wavelet-like transformation used to convert raw image data into the compressed image data that is stored in the image data structure 90.

Figure 3:
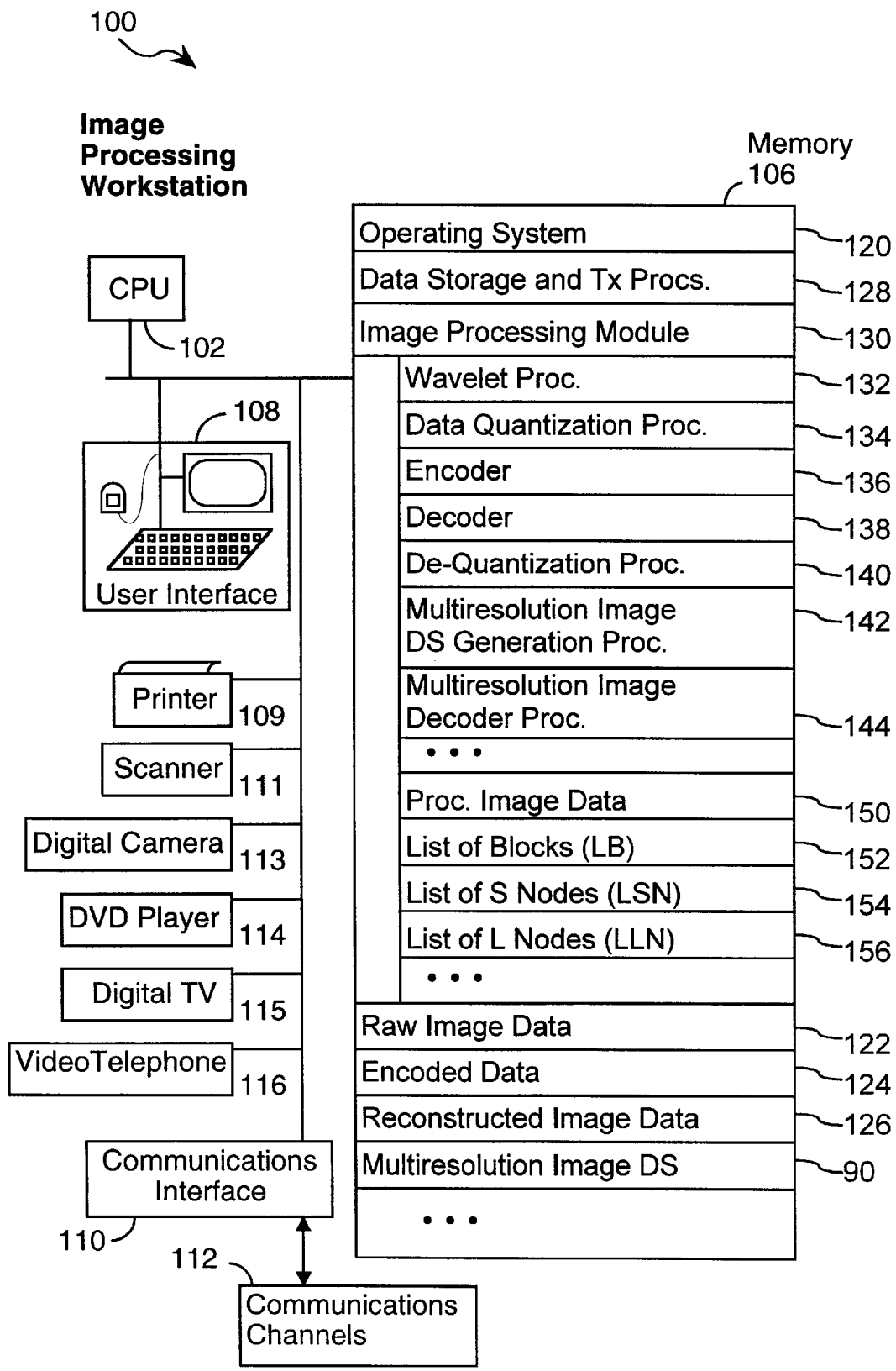
FIG. 3 depicts a computer system incorporating a preferred embodiment of the present invention.

Referring to FIG. 3, there is shown a computer system or workstation 100 that incorporates a preferred embodiment of the present invention. The system 100 includes a central processing unit 102, internal system, control and data busses 104, memory 106 (including random access memory as well as non-volatile memory such as magnetic disk storage), a user interface 108, a high resolution printer 109 suitable for printing images (e.g., photographs, medical images, etc.), and a communications interface 110 for transferring information to and from other devices via one or more communication channels 112. Other input and output devices which the workstation 100 may include are:

- an image scanner 111;
- a digital camera 113;
- a DVD player 114 (for input and possibly output, if the DVD player include data recording capabilities);
- a digital television 115 (for both input and output); and
- a video telephone 116.

It should be understood that no one system is likely to contain all the above mentioned I/O devices. Rather, these are examples of devices that can be used in conjunction with the present invention. Further, the system 100 could be incorporated in some of the above mentioned devices, or in a controller for some of those devices.

Memory 106 stores both computer software and data, including:

- an operating system 120;
- raw image data 122, such as image data files generated by a digital camera, CAT scan device, MR (magnet resonance) imaging system, or an image scanner;
- encoded data 124, such as compressed image data files generated by a data encoder or data encoding procedure;
- reconstructed image data 126, such as reconstructed image data files generated by a data decoder and wavelet data reconstruction procedure;
- multiresolution image data structures 90;
- procedures 128 for managing the storage, transmission and receipt of data files;
- an image processing module 130 for processing image data.

In the preferred embodiment, the image processing module 130 includes:

- a wavelet (or wavelet-like) transform procedure 132 for transforming arrays of data using wavelet transforms into wavelet analyzed data and vice versa;
- a data quantization procedure 134 for quantizing the wavelet analyzed data (also known as wavelet coefficients) produced by the wavelet procedure 132;
- an encoder procedure 136 for encoding an array of data;
- a decoder procedure 138 for decoding a set of encoded data into a corresponding reconstructed data array;
- a data de-quantization procedure 140 for remapping quantized wavelet coefficients back into wavelet coefficients;
- a procedure 142 for generating multiresolution image data structures; and
- a procedure 144 for decoding multiresolution image data structures.

The image processing module 130 also includes a number of data structures, including:

- processed image data files or storage arrays 150 for temporarily storing wavelet analyzed data or decoded data (an array 150 represents the data produced by the wavelet transformation and quantization procedures 132, 134, before application of the encoder procedure 136); and
- a block list and two node list data structures 152, 154, 156 for storing data utilized by the encoder and decoder procedures 136, 138.

For the purposes of explaining the operation of the encoder and decoder procedures, the specific type of wavelet transform procedure 132 used and the specific type of data quantization procedure 134 used to transform an image file into a processed image data file are not relevant and therefore are not further described herein. However, a preferred embodiment of the wavelet transform procedure 132 and the data quantization procedure 134 are described in U.S. patent application Ser. No. 08/758,224, filed Nov. 27, 1996, "System and Method for Performing Wavelet and Inverse Wavelet Like Transformations of Digital Data Using Only Add and Bit Shift Arithmetic Operations", which is hereby incorporated by reference as background information.

The "wavelet" transforms and inverse transforms used in the preferred embodiment are actually "wavelet-like" in that transform functions are spatially truncated, and therefore do not meet some of the definitions of wavelet functions. The wavelet-like transforms used in the preferred embodiment are described above in the previously mentioned U.S. patent application Ser. No. 08/758,224, filed Nov. 27, 1996.

For the purposes of this document, the terms "wavelet transform" and "wavelet coefficients" shall be defined to include wavelet-like transforms and wavelet-like coefficients, respectively. Further, the term "coefficients" is defined to mean either the result of applying a transform to image data, or (as in the preferred embodiment) the values generated when the transformed image data is quantized.

The data quantization procedure 134, encoder 136, decoder 138 and de-quanitzation procedure 140 are described in detail in U.S. patent application Ser. No. 08/858,035, filed May 16, 1997, entitled "System and Method for Scalable Coding of Sparse Data Sets", now U.S. Pat. No. 5,949,911, which is hereby incorporated by reference as background information. Only those aspects of procedures 134, 136, 138 and 140 and their associated data structures that are directly relevant to the present invention will be described in this document.

Figure 4:
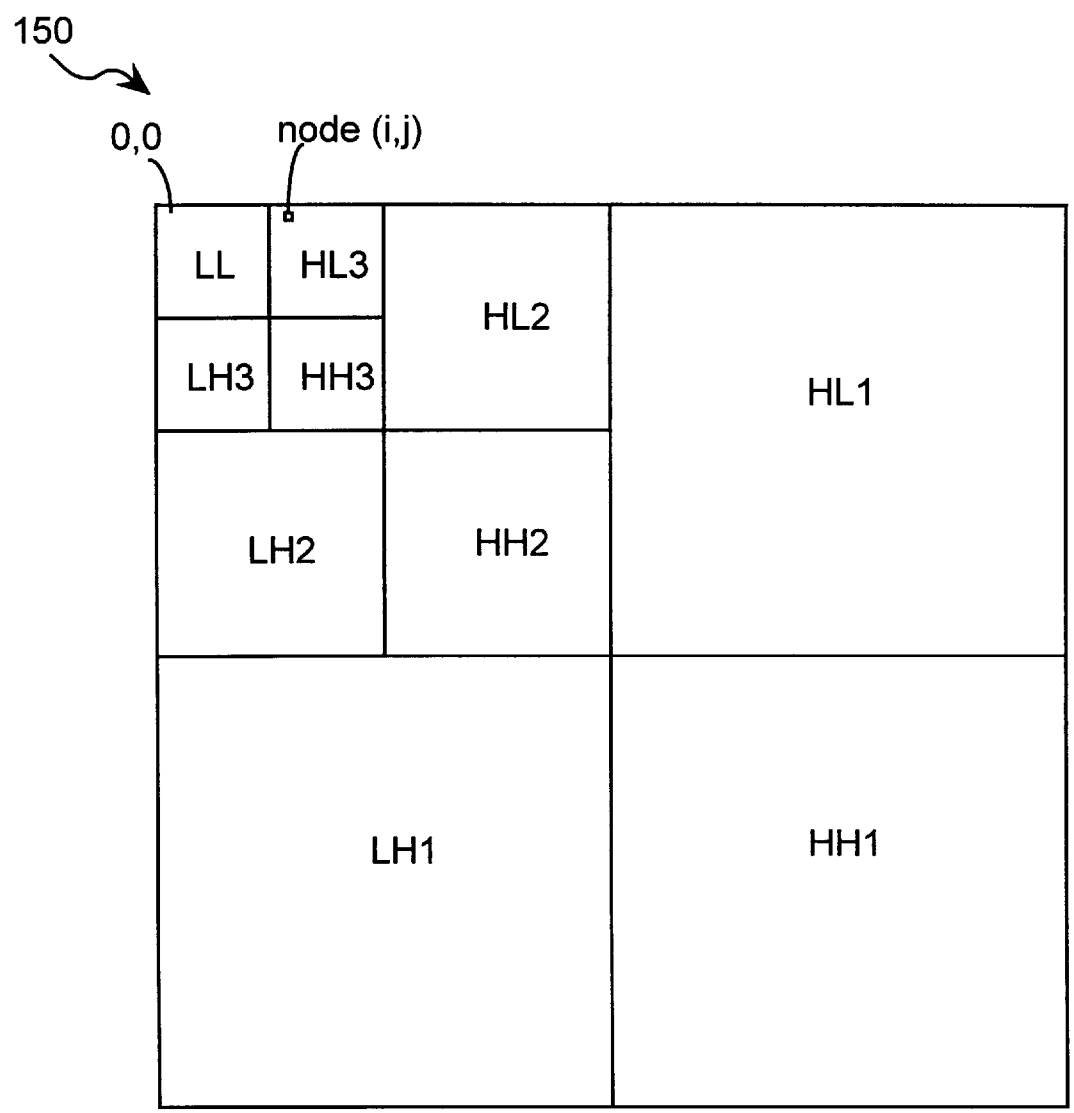
FIG. 4 schematically represents an image data array that has been wavelet transformed.

Referring to FIG. 4, there is shown a two dimensional array 150 of coefficients generated by successive applications of a wavelet decomposition transform. A first application of the wavelet decomposition transform to an initial two dimensional array of data generates four sets of coefficients, labeled LL, HL1, LH1 and HH1. Each succeeding application of the wavelet decomposition transform is applied only to the LL set of coefficients generated by the previous wavelet transformation step and generates four new sets of coefficients, labeled LL, HLx, LHx and HHx, where x represents the wavelet transform "layer" or iteration. After the last wavelet decomposition transform iteration only one LL set remains. The total number of coefficients generated is equal to the number of data samples in the original data array. The different sets of coefficients generated by each transform iteration are sometimes called layers. The number of wavelet transform layers generated for an image is typically a function of the resolution of the initial image. For images having a resolution of 1024×1024 or greater, performing five to seven wavelet transformation layers is fairly typical.

Referring FIGS. 2, 4, 5A and 5B, the full image data 96 in the preferred embodiment is an encoded version of the array 150 of transformed image data (i.e., wavelet coefficients). In particular, in the preferred embodiment, the array 150 is divided into "analysis arrays" of a fixed size, such as 32×32, or 64×64 (or more generally $2^n \times 2^n$, for some integer value of n). Then each analysis array is encoded using the sparse data encoding technique that is taught by U.S. Pat. No. 5,949,911, previously incorporated by reference. The resulting encoded image data includes (A) header data 160 indicating the size of the image array, and (B) a sequence of data structures 162, each representing one analysis array. The header data also includes a list of analysis size values indicating the length of each of the analysis array data structures 162, thereby enabling fast indexing into the image data. In other words the analysis size values enable decoder procedures to locate the beginning of any analysis array data structure 162 without having to decode the contents of the earlier analysis arrays in the image file 96.

Figure 5A:
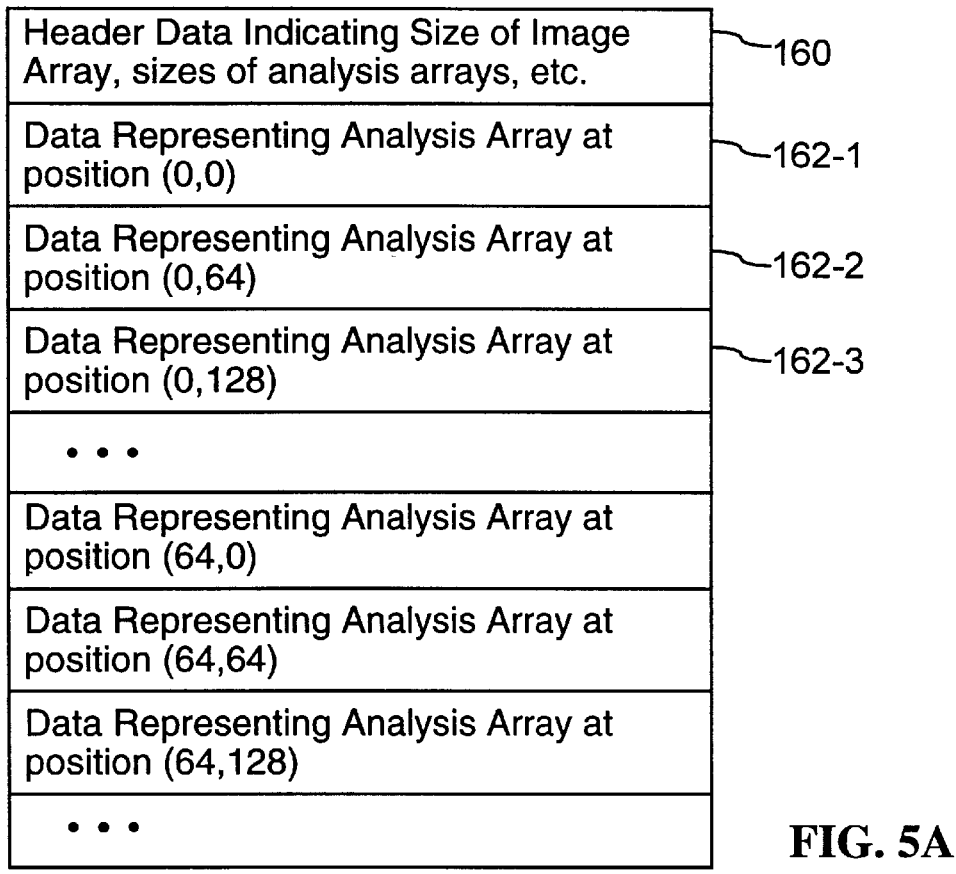
FIGS. 5A and 5B depicts the data structure of a full resolution image and the data structure of one analysis array withing the full resolution image, respectively.
Figure 5B:
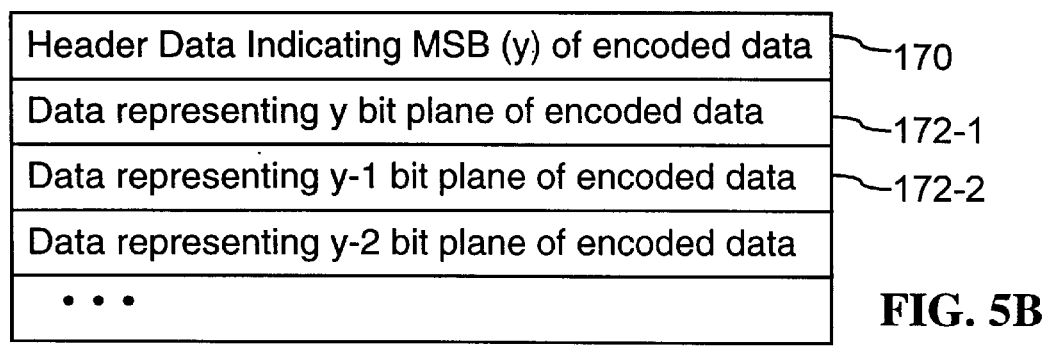

As shown in FIG. 5B, the encoded data 162 representing any one analysis array is stored in "bit layer order". For each analysis array, the encoding procedure determines the most significant non-zero bit in the data to be encoded, which is herein called the $y^{th}$ bit. The value of y is determined by computing the maximum number of bits required to encode the absolute value of any data value in the analysis array. In particular, y is equal to $int(\log_2 V)+1$, where V is the largest absolute value of any element in the analysis array, and "int( )" represents the integer portion of a specified value.

The encoded data 162 representing one analysis array includes (A) header data 170 indicating the maximum number of bits required to encode the absolute value of any data value in the analysis array, and (B) a sequence of data structures 172, each representing the $y^{th}$ bit plane of the elements in the analysis array. The $y^{th}$ bit plane of the analysis array is the $y^{th}$ bit of the absolute value of each of the elements in the analysis array. A sparse data encoding technique is used so that it takes very little data to represent a bit plane that contains mostly zero values. Typically, higher frequency portions of the encoded data array 150, such as HL1, HH1 and LH1, will contain more zero values than non-zero values, and further most of the non-zero values will have relatively small absolute value. Therefore, the higher level bit planes of many analysis arrays will be populated with very few non-zero bit values.

In an alternate embodiment, the data structure shown in FIG. 5A is modified slightly. In particular, to facilitate fast extraction of mid-resolution image data from an image file, the boundaries of the analysis arrays are adjusted, if necessary, so as to coincide precisely with the boundaries between the wavelet transform regions shown in FIG. 4 (e.g., the boundary between LL and HL3). If the size of the initial image array is not equal to $2^N \times 2^N$ for an integer value of N, at least some of the boundaries between wavelet transform regions will fall in the middle of the analysis regions whose size is $2^n \times 2^n$, for some integer value of n. For example, for a 800×600 pixel image, the LL region might have a size of 50×38. If the wavelet transform coefficients are encoded in units of analysis regions of size 32×32, the LL region will be encoded in four analysis regions, three of which would normally contain data for neighboring wavelet transform regions. In this alternate embodiment, each analysis array that overlaps a border between wavelet transform regions is replaced by two or four analysis regions (depending on whether the analysis array overlaps one or two region boundaries), with zero values being stored in the appropriate locations so that each analysis array contains data from only one wavelet transform region. The analysis arrays are still stored in "origin sorted order" in the image file 96, with the "origin" now being defined as the coordinate of the coefficient closest to the upper left corner of the analysis array that has not been overwritten with zero values.

In the preferred embodiment, the image data is encoded using regularly spaced analysis arrays without regard to the locations of boundaries between wavelet transform regions. In this preferred embodiment, extracting the data for a particular image resolution level requires extracting a portion of the data from the analysis regions that overlap the corresponding wavelet transform regions.

Thumbnail Resolution Level—Thumbnail Data

Figure 6:
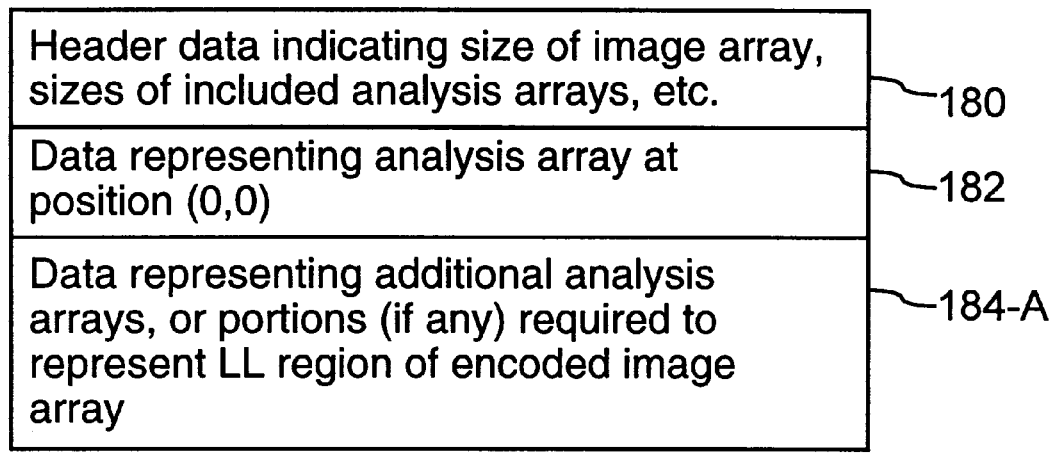
FIG. 6 represents the data structure for a thumbnail image.

In the preferred embodiment the thumbnail data structure 94, shown in FIG. 6, represents the LL region of the encoded image array 150. More specifically, it includes:

header data 180 indicating the size of the thumbnail image data array, and the sizes of the analysis arrays included in the thumbnail data;

data 182 representing the analysis array at position (0,0). This is the analysis array located in at the origin or top left corner of the encoded image array 150 (FIG. 4). Depending on the size of the LL region relative to the size of the analysis arrays, this data 182 may include more or less than the LL region; and data 184-A representing any additional analysis arrays, or portions of analysis arrays (if any) required to fully represent the LL region of the encoded image array 150. If the LL region is larger than one analysis array, the data 184 includes the additional data needed to fully represent the LL region. If the boundaries of the analysis arrays do not match the boundaries of the LL region, data 184-A contains analysis arrays that have been revised so as to exclude data outside the LL region. Alternately, the analysis regions in data 184-A could include "extraneous" data outside the LL region, with the decoder procedure 138 containing instructions to ignore that extraneous data when decoding and displaying the thumbnail image.

More generally, the thumbnail data 94 is selected from the full image data so as to produce an acceptable quality, low resolution image. The amount of data included in the thumbnail data 94 may be determined, in various embodiments, such as by including in the thumbnail data only as much data as will fit in a predetermined fraction of the storage space required for the full image data. This might require elimination of some of the least significant bit planes of the LL data, or might allow inclusion of both the LL data and data outside the LL region, depending on the size of the LL region and the resolution level for the thumbnail image.

Generating Mid-Level Resolution Images

In the preferred embodiments, the multiresolution image data structure 90 (FIG. 2) only includes data representing the thumbnail and highest resolution versions of the image. Mid-level resolution images are generated on the fly, either when the user first begins using the image, or when the user first requests use of the image at a particular mid-level resolution. When using the present invention, generating a data structure 90 representing a mid-level resolution image is extremely fast, because only extraction of data from the full resolution encoded data is required; generating the data for a mid-level resolution image requires no computations or recomputations of coefficient values.

Figure 7:
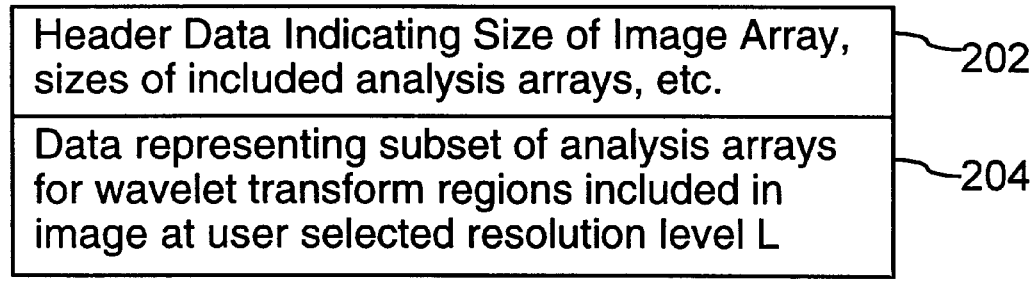
FIG. 7 depicts a data structure representing a mid-level resolution image.

Referring to FIG. 7, generating the data structure 90 for a mid-level resolution image is accomplished simply by copying the analysis arrays for the set of wavelet transform regions corresponding to the user selected resolution level L. If the analysis arrays at the boundary of the needed wavelet transform regions also included data for neighboring wavelet transform regions, that extra data is discarded either when forming the mid-level resolution image data structure, or during decoding of the mid-level resolution image data. Discarding the data for the unneeded neighboring wavelet transform regions usually requires the boundary analysis arrays to be decoded, the unneeded data replaced with zero values, and then re-encoded. Therefore this methodology is used only in systems where memory resources are deemed to be more limited than computational resources.

To generate higher resolution images than the thumbnail, the multiresolution image decoder procedure 144 (FIG. 3) determines the set of wavelet resolution layers corresponding to the user selected resolution level L, determines the corresponding set of analysis arrays, and then copies that data into a new data structure 90. More specifically the mid-resolution data structure 90, includes:

header data 202 indicating the size of the mid-resolution image data array, and the sizes of the analysis arrays included in the mid-resolution image data;

data 204 representing the subset of the analysis arrays needed to cover the wavelet transform regions included in the user selected (or application selected) mid-resolution image.

Figure 8:
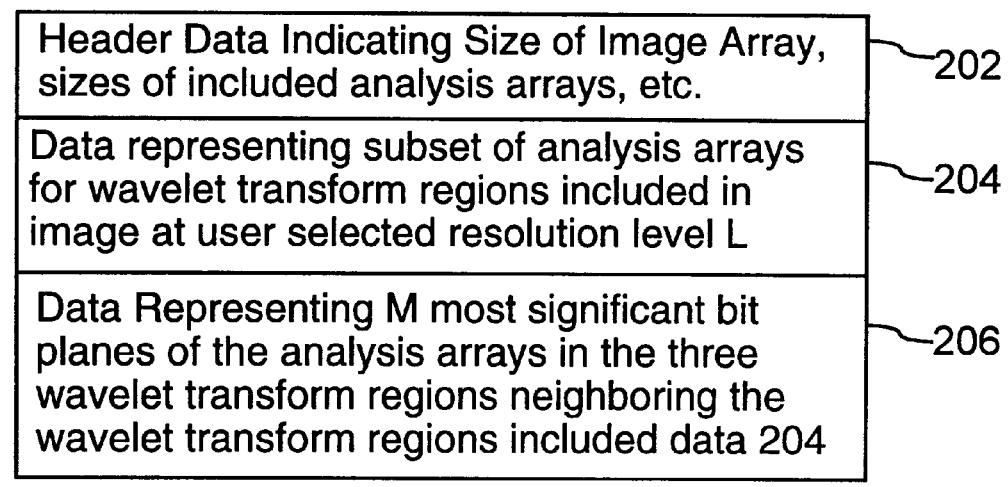
FIG. 8 depicts an alternate data structure representing a mid-level resolution image.

Referring to FIG. 8, in an alternate embodiment, the user can select one or two "fidelity enhancement levels" in addition to an image resolution level. In particular, the data for the analysis arrays for the wavelet transform regions corresponding to the user selected resolution level L is supplemented with a subset of the data for the immediately neighboring wavelet transform regions. For instance, the data structure 200 for the enhanced fidelity mid-level resolution image will contain, in addition to the header 202 and data 204 described above, data 206 representing the M most significant bit planes of the analysis arrays in the three wavelet transform regions neighboring the wavelet transform regions included in data 204.

When image data 200 is decoded to generate an image, the image array will initially be four times the size of the user specified resolution level. That initial image array is then used to construct a high fidelity image at the user specified resolution level (i.e., at the user selected image size), using conventional image size manipulation techniques.

For an even higher fidelity image, the system may construct a mid-level data structure for the next higher resolution level than the one selected by the user (i.e., including all the bit planes for the neighboring wavelet transform regions), decode that data and then display it at the user selected resolution. In both cases, the use of additional data increases the fidelity of the resulting image.

The image data structure 90 (FIG. 7) or 200 (FIG. 8) for any mid-level resolution image can be generated with minimal computational resources, simply by copying the relevant subset of analysis arrays into a new data structure. Even if the analysis arrays along the right and lower boundaries are decoded and re-encoded to eliminate unneeded data from neighboring wavelet transform regions, very few computational cycles are needed. Even in the worst case, such as producing a 1024×1024 image from a 2048×2048 full resolution image, the time required to generate the mid-level resolution image data structure 90 will typically be much less than 0.1 seconds using a 100 MHz data processor. If the extraction technique uses only copying (i.e., no decoding and re-encoding), the computation time will typically be extremely short (e.g., less than 0.01 seconds for the example presented earlier in this paragraph).

Multiple Resolution Rendering of Selected Image Region

Figure 9:
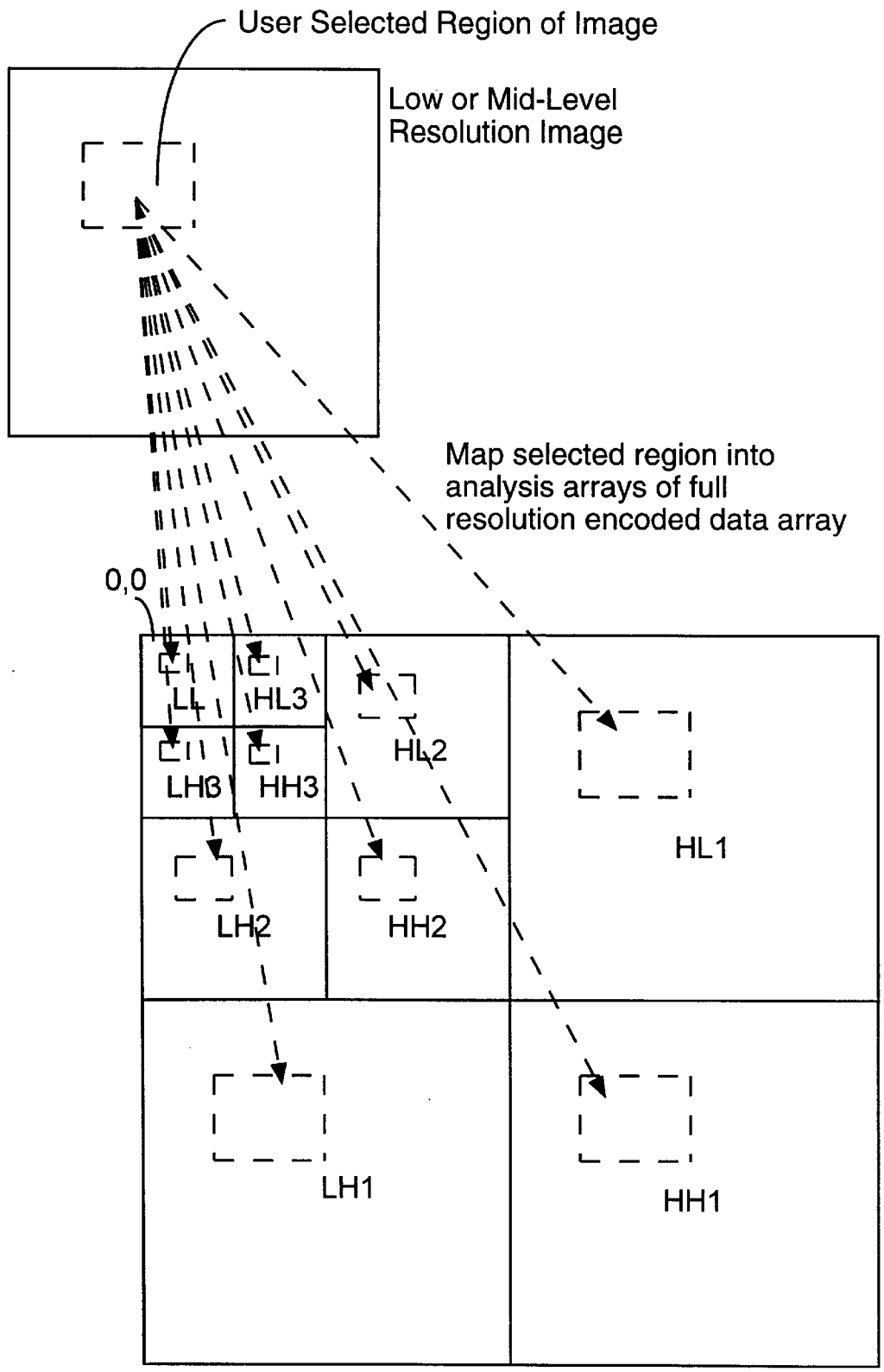
FIG. 9 depicts the mapping a user selected image region into a subset of the analysis arrays representing the full resolution image.

Referring to FIG. 9, using either the thumbnail resolution image, a mid-level resolution image, or even the highest resolution level image, the user may designate a selected region of the image for viewing (or printing or other processing) at any user specified resolution level. This is sometimes called cropping the image. Usually, the user crops a low resolution level image for displaying at a higher resolution. In a preferred embodiment, the selected region (also called the cropped region) is designated by the user, using the same type of graphic user interface tools commonly used for selecting image portions in programs running under Windows95, Macintosh OS or Solaris. In other words, the user guides a pointing device, such as a mouse, while pressing an appropriate key or button so as to designate the region of interest.

Figure 10:
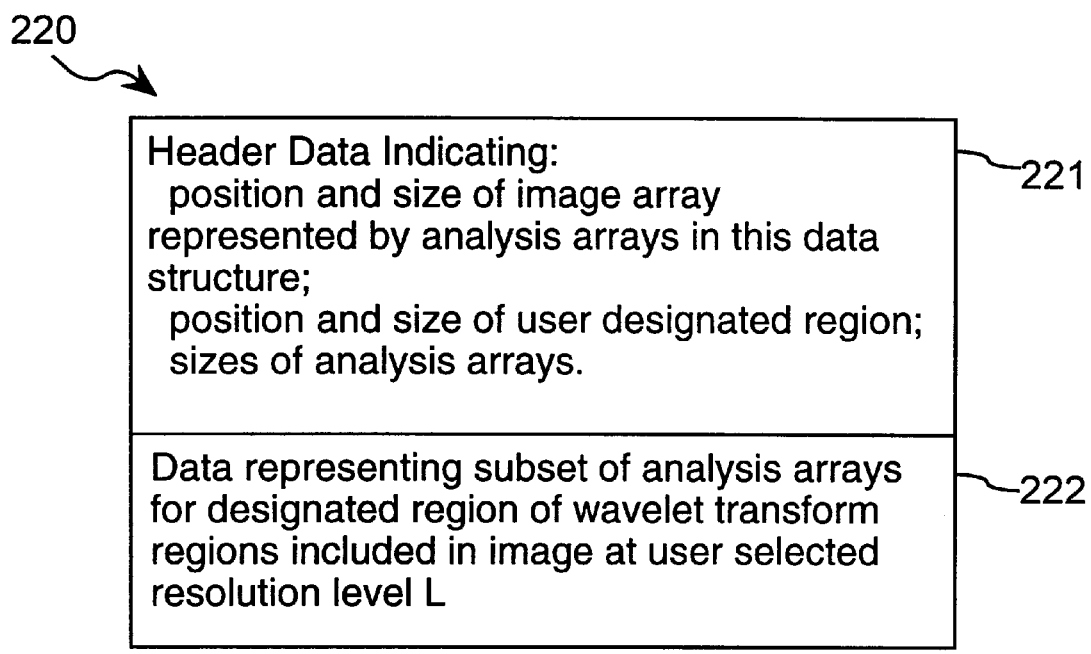
FIG. 10 depicts a data structure representing a mid-level resolution version of a user selected portion of an image.

The multiresolution image decoder procedure 144 maps the selected image region into a set of corresponding analysis arrays. In other words, the procedure 144 identifies all the analysis arrays in the encoded image data that contain data for the selected image region. Then the procedure generates a new data structure 220, shown in FIG. 10, that includes:

a header 221 indicating the position and size of the image array represented by the analysis array portions included in the data structure, and the position and size of the user selected image region, which is usually smaller than the portion of the image represented by the data structure; the header 221 also preferably indicates the size of the analysis arrays needed to represent the user designated image region at the user selected resolution level; and data 222 representing the analysis arrays that represent the user designated image region at the user selected resolution level.

If the selected resolution level is the highest resolution level, then analysis arrays from all the wavelet transform regions are included in the data structure 220. The data structure 220, representing a selected image region at a selected resolution level may be temporarily stored in memory for conversion into image data, it may be stored in non-volatile storage for later use, of it can be transmitted to another computer for storage and/or conversion into image data.

Displaying and Printing Images and Image Portions

The data array representing the image at any resolution level, or a user selected portion of the image at any selected resolution level, is rendered for displaying or printing by:

executing the decoder procedure 138 to decompress the array of encoded image data into a "regenerated" (and typically rectangular) array of quantized wavelet coefficients;

executing the de-quantization procedure 140 to convert the quantized wavelet coefficients (generated by the decoder procedure 138) into a "regenerated" array of wavelet coefficients; and executing the wavelet procedure 132 to perform a reverse wavelet transform on the regenerated array of wavelet coefficients so as to generate an array of image data.

The resulting array of image data can be displayed on a monitor in the user interface 108, printed on printer 109, transmitted to a facsimile machine, or used as input to any other type of image processing device or software application.

Alternate Embodiments

In some embodiments, a workstation may include the procedures for decoding and rendering multiresolution images, while not including the procedures for encoding images into a multiresolution data structure. Similarly, it would be possible to set up a workstation to include the procedures for encoding images into a multiresolution data structure, but not include the corresponding decoding procedures.

The present invention can be implemented using wavelet transform data that has been encoded using a tree structure encoding methodology instead of the block encoding methodology of the preferred embodiment. An example of an appropriate tree encoding methodology is taught in U.S. patent application Ser. No. 08/758,589, filed Nov. 27, 1996, entitled "System and Method for Tree Ordered Coding of Sparse Data Sets," now U.S. Pat. No. 5,893,100, which is hereby incorporated by reference as background information.

In the tree structure encoded embodiment, the thumbnail image and mid-resolution level images are generated by truncating the tree data structure so as to exclude data from the wavelet resolution regions not included at the corresponding resolution level. Thus, the mid-resolution level images are still generated on the fly by extracting data from the full image data array; however, the method of extracting the data differs because of the different data structures used.

A primary benefit of using the tree structure embodiment is that it is very easy to extract the data for any user selected image region. Referring to FIG. 9, once a rectangular image region has been selected, the multiresolution image generation procedure simply extracts from the full image data structure the trees whose roots are in the user selected portion of the LL region, and truncates the extracted trees to include only the wavelet transform regions corresponding to the user selected resolution level.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. Image processing apparatus, for use in conjunction with an image display device, the image processing apparatus comprising:

a memory device for storing data, including a first image data structure, the first image data structure including a first array of wavelet transform coefficients corresponding to a full resolution image;

a data processor coupled to the memory device;

a multiresolution image management procedure, executable by the data processor, including instructions for generating an image at any of a plurality of selectable resolution levels, the instructions including:

image reconstruction instructions for applying an inverse wavelet or wavelet-like transform to a specified set of image data so as to generate image data for displaying a corresponding image on the image display device; and image data extraction instructions, for use when an image resolution level lower than full resolution is selected, wherein the image data extraction instructions generate a second image data structure from the first image data structure by extracting a subset of the wavelet transform coefficients from the first array and storing the extracted subset in a second array in the second image data structure;

wherein the image reconstruction instructions operate on the second image data structure when an image resolution level lower than full resolution is selected and operate on the first image data structure when a full image resolution is selected.

2. Image processing apparatus, for use in conjunction with an image display device, the image processing apparatus comprising:

a memory device for storing data, including a first image data structure, the first image data structure including a first array of wavelet transform coefficients corresponding to a full resolution image;

a data processor coupled to the memory device;

a multiresolution image management procedure, executable by the data processor, including instructions for generating an image at any of a plurality of selectable resolution levels, the instructions including:

image reconstruction instructions for applying an inverse wavelet or wavelet-like transform to a specified set of image data so as to generate image data for displaying a corresponding image on the image display device; and image data extraction instructions, for use when an image resolution level lower than full resolution is selected, wherein the image data extraction instructions generate a second image data structure from the first image data structure by extracting a subset of the wavelet transform coefficients from the first array and storing the extracted subset in a second array in the second image data structure;

wherein the image reconstruction instructions operate on the second image data structure when an image resolution level lower than full resolution is selected and operate on the first image data structure when a full image resolution is selected;

wherein the first array includes a sequence of subarrays, each representing a rectangular set of wavelet coefficients in a respective region of a wavelet or wavelet-like transform coefficient array;

the image data extraction instructions include instructions for copying a subset of the subarrays in the first array into the second array, without modification thereof, wherein the subarray subset is determined in accordance with the selected resolution level.

3. The image processing apparatus of claim 2, wherein the image data extraction instructions include instructions for partially copying a second subset of subarrays in the first array into the second array, the wavelet coefficients represented by each subarray in the second subset including some wavelet coefficients associated with the selected resolution level and some wavelet coefficients not associated with the selected resolution level; and each subarray in the second subset is partially copied by decoding the subarray to generate a rectangular set of wavelet coefficients, replacing with zero values the wavelet coefficients in the rectangular set that are not associated with the selected resolution level, re-encoding the rectangular set of wavelet coefficients and storing the re-encoded set of wavelet coefficients in the second array.

4. The image processing apparatus of claim 2, wherein the subarray subset is determined in accordance with the selected resolution level and a user specified subregion of the image corresponding to the first array.

5. The image processing apparatus of claim 2, wherein the first image data structure includes a thumbnail data structure containing an array of wavelet transform coefficients corresponding to a low resolution image;

the multiresolution image management procedure including instructions for displaying the decoding the thumbnail data structure and displaying the low resolution image.

6. The image processing apparatus of claim 2, the multiresolution image management procedure including:

image cropping instructions for enabling a user to select a cropped portion of the low resolution image; and cropped image data extraction instructions for generating a third image data structure from the first image data structure by extracting from the first array a subset of the wavelet transform coefficients corresponding to the cropped portion of the low resolution image and storing the extracted subset in a third array in the third image data structure.

7. The image processing apparatus of claim 1, the multiresolution image management procedure including:

image cropping instructions for enabling a user to select a cropped portion of an image displayed on the image display device, wherein the displayed image has been generated from data in the first data structure or in the second data structure; and cropped image data extraction instructions for generating a third image data structure from the first image data structure by extracting from the first array a subset of the wavelet transform coefficients corresponding to the cropped portion of the displayed image and storing the extracted subset in a third array in the third image data structure.

8. The image processing apparatus of claim 1, wherein the first array includes a set of tree structures, each representing a tree of wavelet coefficients at respective positions in a wavelet or wavelet-like transform coefficient array; and the image data extraction instructions include instructions for copying a portion of each of the tree structures into the second array, wherein the copied portion is determined in accordance with the selected resolution level.

9. A method of processing image data, for use in conjunction with an image display device, the steps of the method comprising:

storing a first image data structure, the first image data structure including a first array of wavelet or wavelet-like transform coefficients corresponding to a full resolution image;

generating a second image data structure from the first image data structure by extracting a subset of the wavelet or wavelet-like transform coefficients from the first array and storing the extracted subset in a second array in the second image data structure; and applying an inverse wavelet or wavelet-like transform to the wavelet or wavelet-like transform coefficients in the second image data structure so as to generate image data for displaying a corresponding image on the image display device;

wherein the first array includes a sequence of subarrays, each representing a rectangular set of coefficients in a respective region of a wavelet or wavelet-like transform coefficient array;

the second image data structure generating step includes copying a subset of the subarrays in the first array into the second array, without modification thereof, wherein the subarray subset is determined in accordance with a selected resolution level.

10. The method of claim 9, wherein the second image data structure generating step includes partially copying a second subset of subarrays in the first array into the second array, the wavelet or wavelet-like coefficients represented by each subarray in the second subset including some coefficients associated with the selected resolution level and some coefficients not associated with the selected resolution level; and each subarray in the second subset is partially copied by decoding the subarray to generate a rectangular set of wavelet or wavelet-like coefficients, replacing with zero values the coefficients in the rectangular set that are not associated with the selected resolution level, re-encoding the rectangular set of coefficients and storing the re-encoded set of coefficients in the second array.

11. The method of claim 9, wherein the subarray subset is determined in accordance with the selected resolution level and a user specified subregion of the image corresponding to the first array.

12. The method of claim 9, wherein the first image data structure includes a thumbnail data structure containing an array of wavelet or wavelet-like transform coefficients corresponding to a low resolution image;

the method includes decoding the thumbnail data structure and displaying the low resolution image.

13. The method of claim 12, including enabling a user to select a cropped portion of the low resolution image; and generating a third image data structure from the first image data structure by extracting from the first array a subset of the wavelet or wavelet-like transform coefficients corresponding to the cropped portion of the low resolution image and storing the extracted subset in a third array in the third image data structure.

14. The method of claim 9, including:

enabling a user to select a cropped portion of an image displayed on the image display device, wherein the displayed image has been generated from data in the first data structure or in the second data structure; and generating a third image data structure from the first image data structure by extracting from the first array a subset of the wavelet or wavelet-like transform coefficients corresponding to the cropped portion of the displayed image and storing the extracted subset in a third array in the third image data structure.

15. A computer program product for use in conjunction with a computer controlled system having memory and an image display device, the computer program product comprising a computer readable storage medium and a computer program mechanism embedded therein, the computer program mechanism comprising:

an image storage module for storing data, including a first image data structure, in the memory of the computer controlled system, the first image data structure including a first array of wavelet transform coefficients corresponding to a full resolution image, the first array including a sequence of subarrays, each representing a rectangular set of wavelet coefficients in a respective region of a wavelet or wavelet-like transform coefficient array;

a multiresolution image management module, including instructions for generating an image at any of a plurality of selectable resolution levels, the instructions including:

image reconstruction instructions for applying an inverse wavelet or wavelet-like transform to a specified set of image data so as to generate image data for displaying a corresponding image on the image display device; and image data extraction instructions, for use when an image resolution level lower than full resolution is selected, wherein the image data extraction instructions generate a second image data structure from the first image data structure by extracting a subset of the wavelet transform coefficients from the first array and storing the extracted subset in a second array in the second image data structure, the image data extraction instructions including instructions for copying a subset of the subarrays in the first array into the second array, without modification thereof, wherein the subarray subset is determined in accordance with the selected resolution level;

wherein the image reconstruction instructions operate on the second image data structure when an image resolution level lower than full resolution is selected and operate on the first image data structure when a full image resolution is selected.

16. The computer program product of claim 15, wherein the image data extraction instructions include instructions for partially copying a second subset of subarrays in the first array into the second array, the wavelet coefficients represented by each subarray in the second subset including some wavelet coefficients associated with the selected resolution level and some wavelet coefficients not associated with the selected resolution level; and each subarray in the second subset is partially copied by decoding the subarray to generate a rectangular set of wavelet coefficients, replacing with zero values the wavelet coefficients in the rectangular set that are not associated with the selected resolution level, re-encoding the rectangular set of wavelet coefficients and storing the re-encoded set of wavelet coefficients in the second array.

17. The computer program product of claim 15, wherein the subarray subset is determined in accordance with the selected resolution level and a user specified subregion of the image corresponding to the first array.

18. The computer program product of claim 15, wherein the first image data structure includes a thumbnail data structure containing an array of wavelet transform coefficients corresponding to a low resolution image;

the multiresolution image management module including instructions for displaying the decoding the thumbnail data structure and displaying the low resolution image.

19. The computer program product of claim 15, the multiresolution image management module including:

image cropping instructions for enabling a user to select a cropped portion of the low resolution image; and cropped image data extraction instructions for generating a third image data structure from the first image data structure by extracting from the first array a subset of the wavelet transform coefficients corresponding to the cropped portion of the low resolution image and storing the extracted subset in a third array in the third image data structure.

20. A computer program product for use in conjunction with a computer controlled system having memory and an image display device, the computer program product comprising a computer readable storage medium and a computer program mechanism embedded therein, the computer program mechanism comprising:

an image storage module for storing data, including a first image data structure, in the memory of the computer controlled system, the first image data structure including a first array of wavelet transform coefficients corresponding to a full resolution image;

a multiresolution image management module, including instructions for generating an image at any of a plurality of selectable resolution levels, the instructions including:

image reconstruction instructions for applying an inverse wavelet or wavelet-like transform to a specified set of image data so as to generate image data for displaying a corresponding image on the image display device; and image data extraction instructions, for use when an image resolution level lower than full resolution is selected, wherein the image data extraction instructions generate a second image data structure from the first image data structure by extracting a subset of the wavelet transform coefficients from the first array and storing the extracted subset in a second array in the second image data structure;

wherein the image reconstruction instructions operate on the second image data structure when an image resolution level lower than full resolution is selected and operate on the first image data structure when a full image resolution is selected.

21. The computer program product of claim of 20, wherein the multiresolution image management module includes:

image cropping instructions for enabling a user to select a cropped portion of an image displayed on the image display device, wherein the displayed image has been generated from data in the first data structure or in the second data structure; and cropped image data extraction instructions for generating a third image data structure from the first image data structure by extracting from the first array a subset of the wavelet transform coefficients corresponding to the cropped portion of the displayed image and storing the extracted subset in a third array in the third image data structure.

22. The computer program product of claim of 20, wherein the first array includes a set of tree structures, each representing a tree of wavelet coefficients at respective positions in a wavelet or wavelet-like transform coefficient array; and the image data extraction instructions include instructions for copying a portion of each of the tree structures into the second array, wherein the copied portion is determined in accordance with the selected resolution level.

* * * * *

UNITED STATES PATENT AND TRADEMARK OFFICE
CERTIFICATE OF CORRECTION

PATENT NO. : 6,041,143

DATED : March 21, 2000

INVENTOR(S) : Charles K. Chui and Lefan Zhong

It is certified that error appears in the above-identified patent and that said Letters Patent is hereby corrected as shown below:

In section [75] Inventors: Please replace Zhang with Zhong.

Signed and Sealed this

Tenth Day of April, 2001

Attest:

NICHOLAS P. GODICI

*Attesting Officer*   *Acting Director of the United States Patent and Trademark Office*